United States Patent
Ohda et al.

(10) Patent No.: US 9,136,675 B2
(45) Date of Patent: Sep. 15, 2015

(54) BUFFERING DEVICE FOR THE OPERATING MECHANISM OF A SWITCHGEAR, AND METHOD OF LUBRICATION THEREOF

(71) Applicant: Kabushiki Kaisha Toshiba, Minato-ku (JP)

(72) Inventors: Yoshiaki Ohda, Kanagawa-ken (JP); Yoshikata Kobayashi, Tokyo (JP); Masaharu Shimizu, Kanagawa-ken (JP); Satoshi Marushima, Kanagawa-ken (JP); Hirokazu Takagi, Kanagawa-ken (JP); Tooru Inoue, Kanagawa-ken (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/461,050

(22) Filed: Aug. 15, 2014

(65) Prior Publication Data

US 2014/0353889 A1 Dec. 4, 2014

Related U.S. Application Data

(62) Division of application No. 13/501,047, filed as application No. PCT/JP2010/006006 on Oct. 7, 2010, now Pat. No. 8,844,913.

(30) Foreign Application Priority Data

Oct. 9, 2009 (JP) ................................. 2009-234881

(51) Int. Cl.
*F16H 9/00* (2006.01)
*H01H 33/30* (2006.01)

(Continued)

(52) U.S. Cl.
CPC ............ *H02B 13/0354* (2013.01); *F16F 9/432* (2013.01); *F16F 13/007* (2013.01); *F16N 13/00* (2013.01); *H01H 33/304* (2013.01); *F16F 2230/06* (2013.01); *H01H 3/605* (2013.01)

(58) Field of Classification Search
USPC ........ 267/69–74, 286–291; 200/50.21, 50.24, 200/50.25, 293, 400, 468
See application file for complete search history.

(56) References Cited

U.S. PATENT DOCUMENTS 2,049,963 A * 8/1936 Lancia .................... 280/124.127
6,564,667 B2 * 5/2003 Bayer et al. ................. 74/490.01

(Continued)

FOREIGN PATENT DOCUMENTS

JP      59-97335      6/1984
JP      60 155001     8/1985

(Continued)

OTHER PUBLICATIONS

Extended European Search Report issued Mar. 9, 2015 in Patent Application No. 14194279.7.

(Continued)

*Primary Examiner* — Christopher Schwartz
(74) *Attorney, Agent, or Firm* — Oblon, McClelland, Maier & Neustadt, L.L.P.

(57) ABSTRACT

A piston rod (15) and a first piston (13) are arranged in the interior of an external cylinder (11) and internal cylinder (12); a second piston for absorbing the change of volume of operating fluid (24) is also arranged therein. Also, a first return spring (18) for returning the piston rod (15) to the interruption position is provided and a second return spring (20) for returning the operating fluid 24 into the high-pressure chamber (25) by pressurizing the second piston (14) is provided. In addition, the air in the interior of the buffering device (10) is withdrawn by a vacuum pump (38), and operating fluid (24) is thus introduced in a degassed condition.

5 Claims, 5 Drawing Sheets

(51) Int. Cl.
*H02B 13/035* (2006.01)
*F16F 13/00* (2006.01)
*F16N 13/00* (2006.01)
*F16F 9/43* (2006.01)
*H01H 3/60* (2006.01)

(56) References Cited

U.S. PATENT DOCUMENTS

| | | | | |
|---|---|---|---|---|
| 7,677,539 | B2* | 3/2010 | Adoline | 267/168 |
| 7,910,847 | B2* | 3/2011 | Takahara et al. | 200/293 |
| 8,844,913 | B2* | 9/2014 | Ohda et al. | 267/73 |
| 2008/0289921 | A1 | 11/2008 | Mori et al. | |
| 2010/0187734 | A1 | 7/2010 | Xu et al. | |
| 2010/0320063 | A1* | 12/2010 | Takahara et al. | 200/50.25 |
| 2011/0005906 | A1* | 1/2011 | Dupraz et al. | 200/50.24 |
| 2012/0168293 | A1* | 7/2012 | Jung | 200/468 |

FOREIGN PATENT DOCUMENTS

| | | |
|---|---|---|
| JP | 9 303467 | 11/1997 |
| JP | 10 228847 | 8/1998 |
| JP | 2001-65623 A | 3/2001 |
| JP | 2007 263324 | 10/2007 |
| JP | 2008 291898 | 12/2008 |
| WO | WO 92/01171 A2 | 1/1992 |
| WO | WO 92/01171 A3 | 1/1992 |
| WO | WO 2009/015588 A1 | 2/2009 |

OTHER PUBLICATIONS

International Search Report Issued Nov. 16, 2010 in PCT/JP10/06006 Filed Oct. 7, 2010.
Japanese Office Action issued Mar. 5, 2013 in Patent Application No. 2009-234881.
The Extended European Search Report issued Aug. 22, 2014, in Application No. / Patent No. 10821751.4-1808 / 2487383 PCT/JP2010006006.

* cited by examiner

BUFFERING DEVICE FOR THE OPERATING MECHANISM OF A SWITCHGEAR, AND METHOD OF LUBRICATION THEREOF

CROSS-REFERENCE TO RELATED APPLICATION

This application is a divisional application of U.S. patent application Ser. No. 13/501,047, filed Jun. 6, 2012, which is the U.S. National Stage application of PCT/JP10/006006 filed Oct. 7, 2010, and which claims priority under 35 U.S.C. §119 to Japanese application number JP 2009-234881 filed Oct. 9, 2009, the entire contents of which are incorporated by reference herein.

TECHNICAL FIELD

The present invention relates to an operating mechanism for a switchgear in which opening/closing operation of the switchgear is performed by operating a moving body including an electrical contact, and, in particular, it relates to a buffering device for braking the moving body when operation is performed, and to a method of lubrication thereof.

BACKGROUND ART

In general, the operating mechanism for a high-voltage switchgear is operated by opening/closing operation (interruption/closure operation) of the switchgear, by reciprocating drive of an electrical contact of the switchgear between the open and closed positions. In order for the switchgear to exhibit good interruption performance, it is important for the moving body including the electrical contact to be driven at high speed by the operating mechanism.

In this process, it is desirable for the operating mechanism to maintain the speed of the moving body until a little before it reaches the end position of its interruption operation and then to reduce the speed of the moving body in a comparatively short distance. Consequently, usually, a buffering device constituting means for reducing the speed of the moving body is employed in the operating mechanism.

A first prior art example of such a buffering device is disclosed for example in Laid-open Japanese Patent Gazette, Laid-open Patent Application Number H9-303,467 (FIG. 1) (hereinafter referred to as Patent Reference 1) or, likewise, Laid-open Japanese Patent Gazette, Laid-open Patent Application Number 2008-291898 (FIG. 1) (hereinafter referred to as Patent Reference 2). In this first prior art example, a double-layer cylinder comprising outer and internal cylinders is provided. Of these, the operating fluid is sealed within the external cylinder. Also, buffer orifices are formed at both ends of the internal cylinder.

In addition, within the internal cylinder, a slide rod and piston are slidably arranged. The slide rod is coupled with the drive section of an operating mechanism. Steps provided with a taper are arranged on both sides of the piston. The steps at both ends of the piston are fitted into the buffer orifices at both ends of the internal cylinder.

On the outside of the buffer orifices, a packing is arranged constituting a sealing section for preventing leakage of operating fluid that is sealed within the external cylinder. It should be noted that the operating fluid that flows out from the buffer orifices flows into the opposite side of the piston through an oil return passage that is formed from the gap between the external cylinder and the internal cylinder.

In a buffering device constructed as above, in the case of both interruption operation and closure operation, a slide rod (including a piston) that is coupled with the drive section of the operating mechanism is operated, and, just before the termination of operation, the steps of the piston penetrate into the buffer orifices. From this instant, the pressure within the buffer orifices rises, and a large reaction i.e. braking force is generated tending to push the piston back. By means of this braking force, it is possible to reduce the speed of the slide rod only just before termination of operation.

Also, a second prior art example of a buffering device for the operating mechanism for a switchgear is disclosed in Japanese Laid-open Patent Gazette, Laid-open Patent Application Number H 10-228847 (FIG. 1) (hereinafter referred to as Patent Reference 3). In this Patent Reference 3, just as in the above first prior art example, a double-layer cylinder is provided and a piston is freely slidably arranged in the interior of the internal cylinder. Also, in the internal cylinder, there are formed a plurality of outflow holes for operating fluid, along the circumferential direction. It should be noted that the piston is directly coupled with the output shaft of the operating mechanism.

In the above second prior art example, the number of outflow holes that are in an open condition decreases with sliding movement of the piston. Consequently, the rate of flow of operating fluid out from the internal cylinder decreases, with the result that the pressure of the operating fluid rises, generating braking force. Consequently, a large braking force is generated immediately prior to completion of operation, in reciprocal operation.

PRIOR ART REFERENCES

Patent References

[Patent Reference 1] Laid-open Japanese Patent Application Number H9-303467 (FIG. 1)

[Patent Reference 2] Laid-open Japanese Patent Application Number 2008-291898 (FIG. 1)

[Patent Reference 3] Laid-open Japanese Patent Application Number H10-228847 (FIG. 1)

OUTLINE OF THE INVENTION

Problem that the Invention is Intended to Solve

However, the following problems have been noted regarding prior art example 1 described above. Specifically, in order to obtain a large braking force of the buffering device, it is necessary either to make the pressure-receiving area that is formed by the difference between the cross-sectional area of the piston and the cross-sectional area of the slide rod large, or to generate high pressure.

In this connection, if the pressure-receiving area is made large, the piston diameter becomes large, and the buffering device tends to become bulky overall. It is therefore desired to raise braking performance while maintaining compactness by generating a large braking force by a small cylinder and piston.

Also, prevention of loss of air tightness of the packing which constitutes the sealing section for preventing leakage of operating fluid is vital when generating high pressure in order to obtain a large braking force of the buffering device. In the buffering device according to the first prior art example, slide rods are arranged on both sides of the piston, so there are a large number of sliding sealing portions.

That is to say, in the packing in the first prior art example, pressure resistance tends to be lowered by sliding movement with respect to the slide rods. For example, in the case of packing such as an O ring, whereas when such packing is employed in a fixed portion it is capable of withstanding high pressure (about 1000 atm), when employed at a sliding location, however, it can only withstand a pressure of about half of that.

Furthermore, in the first prior art example, operating fluid, that has reached a high pressure within the buffer orifices, flows out on the low-pressure side of the piston through the oil return passages, reaching the packing. Consequently, the packing is exposed to high-pressure operating fluid, so the sealing member must be capable of withstanding high pressure.

Consequently, the packing of the first prior art example is employed in a sealing portion where it is subjected to sliding under high pressure, so it not only needs to be resistant to pressure but also resistant to wear: such packing is expensive. Indeed, the provision of a large number of expensive packing elements capable of preventing loss of air-tightness of the packing gives rise to severe cost problems.

Furthermore, in the case of the buffering device of the first prior art example, in which slide rods are arranged on both sides of the piston, a construction must be adopted in which the volume of the operating fluid in the cylinder does not change. Consequently, with the object of adjusting for volume changes of the operating fluid, although not shown, typically a component construction is adopted in which entrainment of air from the sealing section of the slide rods occurs: this results in air accumulating within the cylinder.

Also, since the buffering device is basically a device in which braking force is generated by conversion of pressure energy into heat energy, since the operating fluid becomes highly pressurized when the device is operated, the temperature inevitably rises. Furthermore, since environmental temperature changes also take place, if the working fluid is hermetically sealed within a metal container, it is necessary to create a slight air layer, to take into account the difference in thermal expansion of the metal and the operating fluid (a factor of about 100 times or more).

If the air of this air layer becomes mixed with the operating fluid, the viscosity of the operating fluid is lowered, so the braking force changes. In particular, in the case where the switchgear is an interrupter and high-speed reclosing interruption operation is performed, since the interruption action takes place twice in a short time (0.3 sec), if air is mixed with the operating fluid in the first interruption operation, there is a risk that the braking force during the second interruption operation will be considerably different from that during the first interruption operation. There is therefore a strong demand to avoid mixing of the air with the operating fluid.

Also, in the case of the second prior art example, an air layer is provided because the volume of the operating fluid changes with the movement of the piston. Consequently, there were the problems that the attitude in which the buffering device can be mounted is restricted and that the braking force changes as a result of admixture of the air with the operating fluid, as described in connection with the problems of the first prior art example in the above section.

Furthermore, in the second prior art example, the piston of the operating mechanism is directly coupled with the output shaft. Consequently, when the switchgear performs opening/closing operation (interruption/closure operation), the piston is always the load, so braking force acts over the entire stroke. As a result, the braking force of the buffering device also acts during the closure operation of the switchgear, and this is associated with a loss in drive energy of the operating mechanism. The result is that the efficiency of utilization of the drive energy is lowered. It should be noted that loss of drive energy of the operating mechanism was also a problem when sealing portions were present that were subjected to sliding at high pressure, as in the case of the first prior art example described above, due to the increase in frictional force of the sliding sections (sliding resistance).

As described above, with the conventional buffering devices, generation of large braking force with a small cylinder and piston required that sealing portions sliding under high pressure should be eliminated, admixture of air with the operating fluid should be discouraged, and that the drive energy of the operating mechanism should be efficiently utilized.

Incidentally, since, in the buffering device, the operating fluid had to be made to penetrate into narrow gaps between components, pressurization and lubrication of the operating fluid were necessary. Also, if air became mixed with the operating fluid during the lubrication, the task of extracting this air was indispensable, and this meant that a long time was required for the lubrication task.

This embodiment of the present invention was made in order to solve the above problems, its object being to provide a buffering device for the operating mechanism of a switchgear that performs opening/closing of an electrical circuit, capable of maintaining in a stable fashion a large braking force while achieving compactness and capable of utilizing efficiently the drive energy of the operating mechanism and of improving reliability with regard to leakage of the operating fluid, with low cost, without directly applying high pressure to the sliding sealing portions; and, in addition, of providing a method of lubrication of the buffering device whereby the lubrication task of the buffering device can be performed in a short time.

Means for Solving the Problem

In order to achieve the above object, according to an embodiment of the present invention, there is provided: a buffering device employed in an operating mechanism whereby opening/closing action of a switchgear is performed by reciprocal drive of a moving body including an electrical contact between open and closed positions, for reducing the speed of said moving body in the vicinity of termination of the action of the switchgear, characterized in that:

an external cylinder and internal cylinder are provided on the same central axis; a first piston is arranged within aforementioned internal cylinder, and a second piston is arranged within aforementioned external cylinder, these being respectively freely slidably arranged on the same central axis; a piston rod is freely slidably arranged with respect to aforementioned first piston and aforementioned second piston; a packing is fixed in aforementioned second piston in a sliding portion of aforementioned external cylinder and aforementioned piston rod; a first return spring seat is fitted at the end of aforementioned piston rod, in order to restrict the range of movement of aforementioned first piston; a first return spring is arranged between the end of aforementioned internal cylinder and aforementioned first return spring seat; a second return spring seat is fixed on the same central axis within aforementioned external cylinder; a second return spring is arranged between aforementioned second piston and aforementioned second return spring seat; an oil return path is formed between aforementioned piston rod and aforementioned first return spring seat and one end thereof is opened/closed by sliding action of aforementioned first piston; a plurality of through-holes are formed in the axial direction in aforementioned internal cylinder; a plug having a packing is fixed at the end of aforementioned internal cylinder; a high-pressure chamber is formed by the space defined by aforementioned external cylinder, aforementioned internal cylinder, aforementioned plug, aforementioned second piston and aforementioned piston rod; aforementioned plug being linked with a drive portion of aforementioned operating mechanism; operating fluid is sealed in aforementioned high-pressure chamber; and the construction is such that braking force is generated by compression of aforementioned operating fluid of aforementioned high-pressure chamber by aforementioned piston rod being forced into aforementioned high-pressure chamber on drive of aforementioned operating mechanism.

Beneficial Effect of the Invention

With the buffering device of this embodiment of the present invention, the operating fluid can be utilized in a high-pressure condition at the piston portion, so a large braking force can be generated with a small-diameter piston and cylinder, so reduction in size and weight of the device can be promoted. Also, since the high pressure is not directly applied to the sliding sealing portion, expensive packing can be eliminated, contributing to lower costs and improving reliability with regard to leakage of operating fluid.

Furthermore, the construction is one in which change in volume of the operating fluid can be absorbed by combination of the second piston with the second return spring: in this way, there is no need for an air layer on the operating fluid, so stable braking force can be obtained by reliably preventing admixture of the air with the operating fluid. Furthermore, the braking force of the buffering device does not act during the closure operation of the switchgear, so there is no loss of drive energy of the operating mechanism, so improving the efficiency of utilization of the drive energy. Also, with the method of lubrication of the buffering device of this embodiment of the present invention, no air is mixed with the operating fluid, so the lubrication task can be performed rapidly.

EMBODIMENTS OF THE INVENTION

Embodiments of a buffering device for the operating mechanism of the switchgear according to the present invention and a method of lubrication thereof are described below with reference to the drawings.

[1] First Embodiment

Construction

Figure 1:
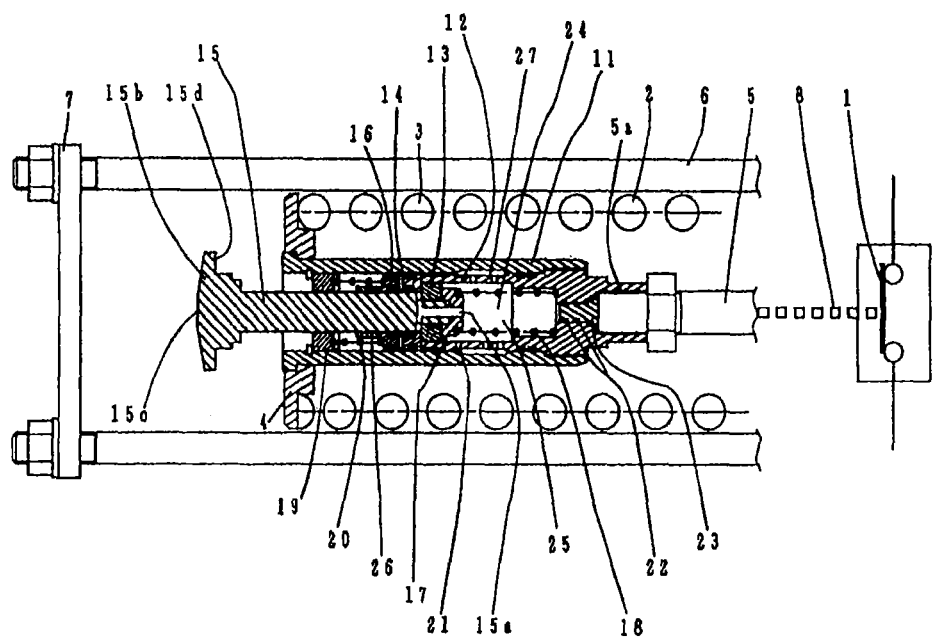
FIG. 1 is a cross-sectional view showing the closure condition of a buffering device for the operating mechanism of a switchgear according to a first embodiment of the present invention.
Figure 2:
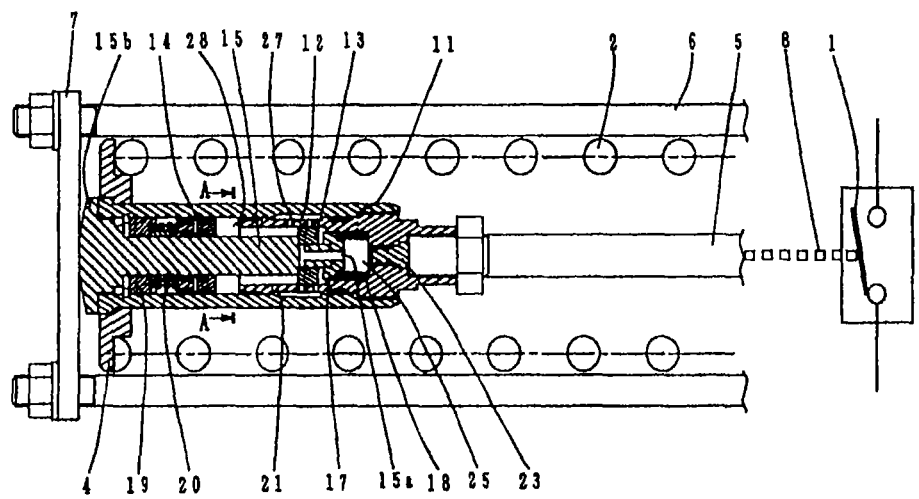
FIG. 2 is a cross-sectional view showing the interruption condition of the buffering device of FIG. 1.
Figure 3:
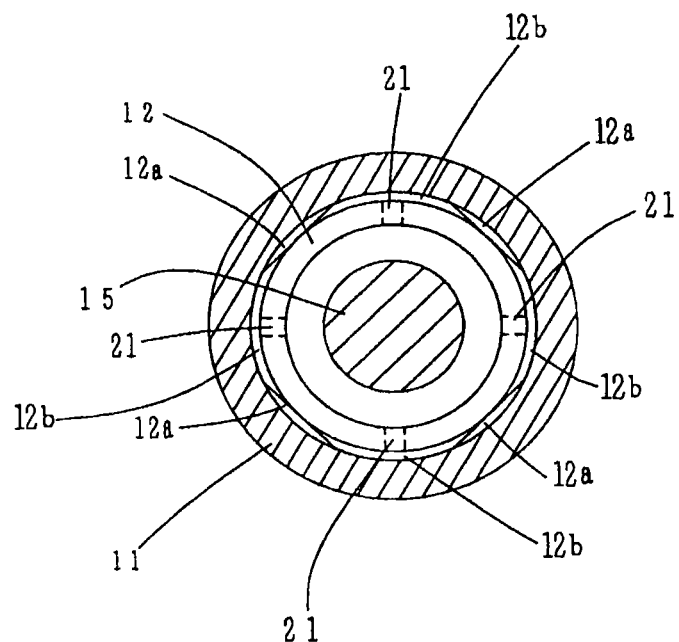
FIG. 3 is a view of the buffering device of FIG. 2 in the direction of the arrows A-A.
Figure 4:
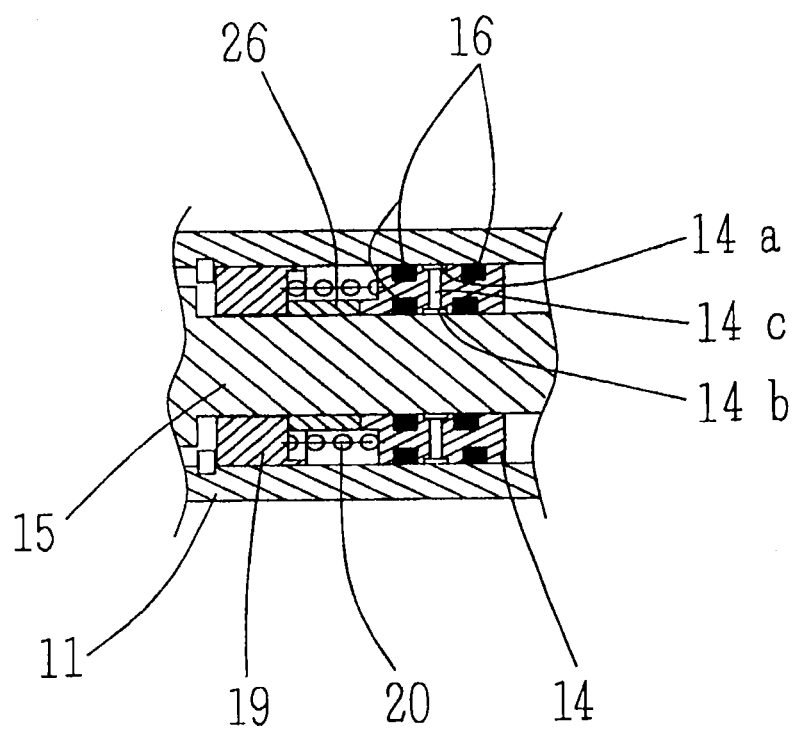
FIG. 4 is a detail view to a larger scale showing a portion of the buffering device of FIG. 2.

First of all, a first embodiment of a buffering device for the operating mechanism of the switchgear according to the present invention will be described with reference to FIG. 1 to FIG. 4. FIG. 1 is a cross-sectional view showing the closure condition of a buffering device 10 for the operating mechanism of a switchgear; FIG. 2 is a cross-sectional view showing the interruption condition of the buffering device 10 shown in FIG. 1. FIG. 3 is a view of the buffering device of FIG. 2 in the direction of the arrows A-A. FIG. 4 is a detail view to a larger scale showing a portion of the buffering device of FIG. 2.

The buffering device 10 serves to reduce the speed of the movable contact 1 constituting the moving body in the operating mechanism of the switchgear. Operating fluid 24 is sealed in the interior of the buffering device 10: braking force is generated by compression of the operating fluid 24 immediately before arrival at the terminal position of movement of the movable contact 1.

As shown in FIG. 1 and FIG. 2, a support structural body 6 is provided in the operating mechanism of the switchgear. An interruption spring 2 is accommodated in the interior of the support structural body 6 and a restraining plate 7 is fixed at the end thereof. An interruption spring seat 4 is mounted at the movable end 3 of the interruption spring 2, facing the aforementioned restraining plate 7. Also, a spring rod 5 is coupled with the movable contact 1 through a linkage section 8: the buffering device 10 is provided so as to be clamped by this spring rod 5 and interruption spring seat 4.

The buffering device 10 comprises: double-layer cylinders 11, 12 and double-layer pistons 13, 14 having the same central axis; a unitary piston rod 15, two packings 16, 22, two return springs 18, 20, the spring seats 17, 19 of these return springs, and a plug 23.

The construction of the buffering device 10 referred to above will now be described in detail. One end of the external cylinder 11 is fixed to the interruption spring seat 4 and this external cylinder 11 extends towards the spring rod 5. The internal cylinder 12 is telescopically fitted in the interior of this external cylinder 11.

The first piston 13 is arranged on the inside of the internal cylinder 12 and the second piston 14 is freely slidably arranged on the inside of the external cylinder 11, respectively. In the closure condition shown in FIG. 1, the second piston 14 is stationary in a condition making contact with the end of the internal cylinder 12, and the first piston 13 is stationary in a condition contacting the second piston 14.

Also, the first piston 13 and second piston 14 are adjacent to each other in the closure condition as shown in FIG. 1, but, in the interruption condition, are slid in the direction such as to separate these, as shown in FIG. 2. Specifically, when the movable contact 1 moves from the closure condition to the interruption condition (from the condition of FIG. 1 to the condition of FIG. 2), the first piston 13 moves to the right-hand side in the Figure and the second piston 14 moves to the left-hand side in the Figure.

The piston rod 15 is arranged so as to be freely slidable with respect to the first piston 13 and the second piston 14. The packings 16 are provided in the second piston 14 at the sliding portion of the external cylinder 11 and the piston rod 15. Also, a piston head 15b is provided at the end (left-hand side end in FIG. 1 and FIG. 2), nearest to the restraining plate 7, on the piston rod 15. This piston head 15b comprises a circular convex surface section 15c having a gently convex surface facing the restraining plate 7, and a flat surface 15d facing the side of the interruption spring seat 4.

The circular convex surface section 15c of the piston head 15b is capable of being moved into contact with or away from the restraining plate 7 and its diameter is set to be less than the diameter of the piston rod 15. Also, in the piston head 15b, the flat surface 15d that is positioned on the opposite side to the circular convex surface section 15c is engaged with the end of the external cylinder 11 that is fixed to the interruption spring seat 4 in such a way that it can be freely separated therefrom.

In the closed condition shown in FIG. 1, the circular convex surface section 15c of the piston head 15b is separated from the restraining plate 7 and the flat surface 15d on the opposite side is separated from the end of the external cylinder 11. From this closed condition, in the interruption condition shown in FIG. 2, the circular convex surface section 15c of the piston head 15b contacts the restraining plate 7 and, furthermore, the flat surface 15d of the piston head 15b and the end of the external cylinder 11 are in contact and stationary.

In addition, a first return spring seat 17 that restricts the range of movement of the first piston 13 is fitted at the end (right-hand side end in FIG. 1 and FIG. 2) on the opposite side of the piston head 15b, on the piston rod 15. Also, between the piston rod 15 and the first return spring seat 17, this one end is formed with an oil return path 15a that is opened and closed by sliding action of the first piston 13. Furthermore, a first return spring 18 is arranged between the first return spring seat 17 and the end of the internal cylinder 12. The first return spring 18 has the function of returning the piston rod 15 to the interruption position.

A second return spring seat 19 with the same central axis is fitted on the inside of the external cylinder 11. A second return spring 20 is arranged between the second return spring seat 19 and the second piston 14. Due to the combination of this second return spring 20 and the second piston 14 referred to above, change in volume of the operating fluid 24 in the high-pressure chamber 25 can be absorbed.

A plurality of through-holes 21 are formed in the internal cylinder 12. In addition, a plug 23 is arranged at the end of the internal cylinder 12, a packing 22 being fixed to this plug 23. Also, the plug 23 is fitted onto a threaded section 5a that is formed at the end of the spring rod 5. The space defined by the external cylinder 11, the internal cylinder 12, the plug 23, the second piston 14 and piston rod 15 constitutes a high-pressure chamber 25: the operating fluid 24 is sealed therein.

Also, between the second piston 14 and a second return spring seat 19, a collar 26 having the same central axis as the piston rod 15 is freely slidably arranged with respect to the piston rod 15. This collar 26 is a member for restricting the height of compression of the second return spring 20.

When the operating fluid 24 in the high-pressure chamber 25 is compressed by the action of the first piston 13, the space into which the operating fluid 24 is injected from the through-hole 21 constitutes a low-pressure chamber 27. Also, as shown in FIG. 2, in the interruption condition, the first piston 13 and the second piston 14 are separated and a liquid chamber 28 is formed constituting the space defined by these pistons 13, 14 and the piston rod 15.

The operating fluid 24 that has flowed out from the through-holes 21 into the low-pressure chamber 27 flows in from the low-pressure chamber 27 to the liquid chamber 28. Cutaway sections 12a and projections 12b to obstruct the flow of the operating fluid 24 are then arranged at the end of the internal cylinder 12; the projections 12b are arranged in substantially the same plane as the through-holes 21 (see FIG. 3).

Incidentally, while, as shown in FIG. 4, the packings 16 are provided at the sliding portion of the external cylinder 11 and the piston rod 15 in the second piston 14, in more detail, these packings are fixed at two respective locations at the outer circumference and inner circumference of the second piston 14. An outer circumferential groove 14a is formed between the two packings 16 on the outer circumferential side and an inner circumferential groove 14b is formed between the two packings 16 on the inner circumferential side. Also, a plurality of through-holes 14c that link these two are arranged between the outer circumferential groove 14a and the inner circumferential groove 14b. A space for accumulation of operating fluid 24 is formed by means of the outer circumferential groove 14a, inner circumferential groove 14b and through-holes 14c.

(Interruption Action)

The interruption action, from the closed condition shown in FIG. 1 to the interrupted condition shown in FIG. 2 in the first embodiment constructed in this way will now be described. When an interruption instruction is delivered to the operating mechanism of the switchgear, not shown, from a control device, not shown, the interruption spring 2 starts the interruption action. When the interruption spring 2 has extended by a certain fixed distance, the circular convex surface section 15c of the piston head 15b abuts the restraining plate 7.

From this instant, the piston head 15b and the piston rod 15 start movement towards the side of the spring rod 5. The first piston 13 blocks one end of the oil return path 15a of the piston rod 15 and starts compression of the operating fluid 24 in the high-pressure chamber 25. The first piston 13 blocks a plurality of through-holes 21 but forces the operating fluid 24 in the high-pressure chamber 25 out towards the low-pressure chamber 27 through the open through-holes 21. In this process, the pressure generated in the high-pressure chamber 25 provides braking force, which is transmitted between the piston rod 15 and the spring rod 5, providing a force which halts the action of the interruption spring 2.

The flow of operating fluid 24 flowing into the low-pressure chamber 27 is temporarily held up by the projections 12b that are arranged in substantially the same plane as the through-holes 21, but the operating fluid flows out into the liquid chamber 28 from the portions where the projections 12b are absent i.e. the cutaway portions 12a. The first return spring 18 is compressed with movement of the piston rod 15 and the first return spring seat 17.

The volume of the operating fluid 24 that has flowed into the liquid chamber 28 increases with movement of the second piston 14 towards the piston head 15b. The second piston 14 is subjected to pressure by the spring force of the second return spring 20 as it moves towards the second return spring seat 19, until it is arrested, having undergone a fixed displacement, by the collar 26. FIG. 2 shows the condition in which this interruption action has been completed.

(Closure Action)

Next, the closure action from the interruption condition shown in FIG. 2 to the closure condition shown in FIG. 1 will be described. When an interruption instruction is delivered to the operating mechanism of the switchgear, not shown, from a control device, not shown, the interruption spring 2 starts the interruption action, by means of a closure spring, not shown. In the case of the closure action, the interruption spring 2 starts movement in the opposite direction (closure direction) to the interruption direction, and movement of the spring rod 5, which is linked with the interruption spring 2, the external cylinder 11 and the internal cylinder 12 in the closure direction is commenced.

At this point, since the piston rod 15 is slidable with respect to the external cylinder 11 and internal cylinder 12, it tries to stay in the interruption position. Since the second piston 14 starts movement together with the external cylinder 11, the operating fluid 24 in the liquid chamber 28 is compressed, the first piston 13 moves in the direction of the first return spring seat 17, the oil return path 15a is opened, and a flow path to the liquid chamber 28 and high-pressure chamber 25 is formed.

With further progress of the closure action, the piston rod 15 is forced out towards the restraining plate 7 by the spring force of the first return spring 18 and the operating fluid 24 that is pressurized by the second piston 14 and the second return spring 20 flows into the high-pressure chamber 25 through the oil return path 15a, low-pressure chamber 27 and the plurality of through-holes 21. When the closure action terminates, the second piston 14 is arrested in a position contacting the end of the internal cylinder 12, and the first piston 13 is arrested in a position contacting the second piston 14. The completion condition of the closure condition as described above is shown in FIG. 1.

(Beneficial Effects)

The beneficial effects of the first embodiment described above are as follows. Specifically, in the first embodiment, the piston rod 15 that projects to the atmosphere side is in a single location. Consequently, the cross-sectional area of the first piston 13 can be made large.

Also, there is no need to provide packing for sealing while sliding in the high-pressure chamber 25 that is compressed by the first piston 13. Consequently, the operating fluid 24 that is sealed into the high-pressure chamber 25 can be kept in a high-pressure condition. In this way, a large braking force can be generated with a small-diameter first piston 13 and internal cylinder 12, making it possible to reduce the size and weight of the device.

Furthermore, during braking by the buffering device 10, the operating fluid 24 is reduced in pressure by passing through the through-holes 21 from the internal cylinder 12 and flows out through the cutaway sections 12a constituted by the gaps of the projections 12b from the low-pressure chamber 27 to the liquid chamber 28, and the pressure of the operating fluid 24 is thereby further lowered.

As a result, there is no possibility of the packings 16 that are provided in the sliding portion of the external cylinder 11 and the piston rod 15 being subjected to the action of operating fluid 24 in high-pressure condition. In this way, inconveniences such as leakage of oil can be reduced, and use of expensive sealing members made unnecessary, thereby achieving cost reduction.

Also, in the first embodiment, the second piston 14 and the second return spring 20 perform the function of adjusting for the change of volume of the operating fluid 24 within the buffering device 10. Consequently, it is unnecessary to provide an air layer on the operating fluid 24 within the buffering device 10. In this way, admixture of air with the operating fluid 24 is minimized and considerable stabilization of the braking force of the buffering device 10 can be achieved.

Furthermore, thermal expansion of the operating fluid 24 due to temperature change can be absorbed by the second piston 14 and the second return spring 20. Consequently, leakage of oil from the interior of the buffering device 10 and/or penetration of the air from the outside can be prevented, considerably increasing the reliability in regard to leakage of the operating fluid 24.

Also, as shown in FIG. 4, an external circumferential groove 14a and internal circumferential groove 14b are formed and through-holes 14c are arranged between the two packings 16 in the second piston 14, while a storage space for the operating fluid 24 is formed from the space between these. Consequently, even if traces of operating fluid 24 are scraped out by the piston rod 15, this operating fluid 24 can be accumulated in the aforementioned accumulation space between the two packings 16. It is thereby possible to prevent the operating fluid 24 from being put into a high-pressure condition and leaking to the outside, and entrainment of air from outside the buffering device 10 can be minimized.

Also, when the switchgear is a circuit breaker and high-speed re-closure and interruption action is performed in which a second interruption action is implemented in a short time (within 0.3 sec), the first piston 13 and the piston rod 15 must be returned to their prescribed positions. In the first embodiment, the first piston 13 and the piston rod 15 are moved by the action of the first return spring 18. Also, the pressurized operating fluid 24 in the liquid chamber 28 can be returned from the oil return path 15a of the piston rod 15 and the through-holes 21 into the high-pressure chamber 25 by the second return spring 20 and the second piston 14. In this way, the first piston 13 and the piston rod 15 can be rapidly returned to their original positions.

Also, the second piston 14 is forced onto the second return spring 19 by the pressure of the operating fluid 24 flowing into the liquid chamber 28 from the low-pressure chamber 27, with the result that the second return spring 20 is compressed. If the pressure at this point is larger than the force of the second return spring 20, there is a possibility that the second return spring 20 may get stuck. If the second return spring 20 gets stuck, damage occurs between the bare wires, with the risk that the durability of the spring itself may be lowered. Accordingly, in the first embodiment, generation of this inconvenience is prevented by providing a collar 26 that restricts the height of the compression of the second return spring 20.

Figure 7:
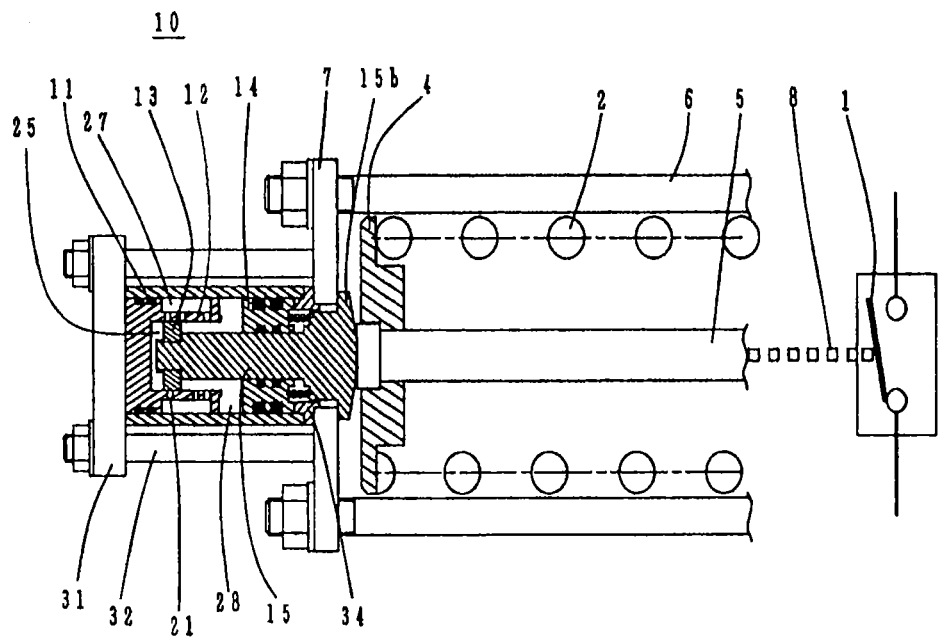
FIG. 7 is a cross-sectional view showing the interruption condition of the buffering device of FIG. 6.

Furthermore, as shown also in FIG. 7, by making the diameter of the circular convex surface section 15c (i.e. the diameter of the circular section that makes planar contact with the spring rod 5 on the side of the opposite face) of the piston head 15b less than the diameter of the piston rod 15, it is possible to keep the bending force acting on the piston rod 15 small while employing a large contact area, when the piston head 15b collides with the restraining plate 7. In this way, mechanical strength and reliability of the piston rod 15 can be improved.

Incidentally the reason for referring to FIG. 7, which is described later, is that it might not be altogether easy to identify what is meant by the diameter of the circular convex surface section 15c in FIG. 1.

[2] Second Embodiment

Construction

Figure 5:
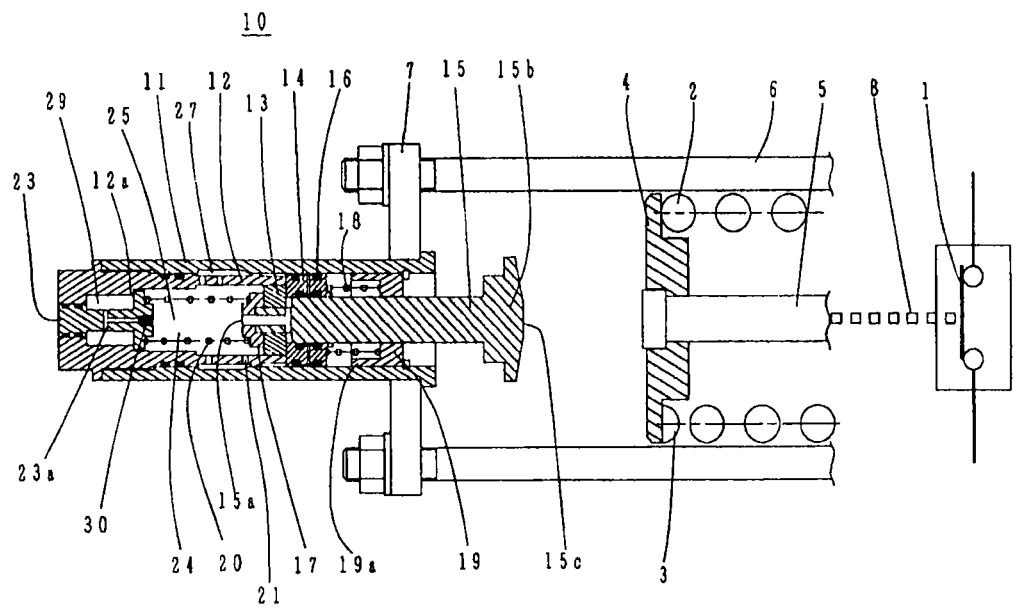
FIG. 5 is a cross-sectional view showing the closure condition of a buffering device for the operating mechanism of a switchgear according to a second embodiment of the present invention.

Next, a second embodiment of a buffering device for the operating mechanism of a switchgear according to the present invention will be described with reference to FIG. 5. FIG. 5 is a cross-sectional view showing the closed condition of the second embodiment of a buffering device for the operating mechanism of a switchgear. It should be noted that parts that are identical with or similar to corresponding parts in the first embodiment are given the same reference numerals, to avoid duplication of description.

In the second embodiment, the mounting position of the buffering device 10 shown in FIG. 1 and the construction of the plug 23 and second return spring seat 19 are altered. Specifically, a construction is adopted in which the external cylinder 11 is fixed to the restraining plates 7, the spring rod 5 is fixed to the interruption spring seat 4, and the end of the spring rod 5 and the end of the piston rod 15 are engaged in such a way that they can be freely brought into contact or separated.

Also one end of the plug 23 projects into the interior of the internal cylinder 12 and is engaged with a step 12a of the internal cylinder 12 in such a way that it can be freely separated therefrom, so that an air chamber 29 is formed from the internal cylinder 12 and plug 23. Furthermore, a plug hole 23a is formed in the plug 23 so as to link the high-pressure chamber 25 and the air chamber 29. A throttle valve 30 having an extremely small flow path is arranged on the side of the high-pressure chamber 25 in the plug hole 23a, so that the air in the operating fluid 24 is shut into the high-pressure chamber 29. Also, projections 19a are arranged at the outer circumference of the second return valve seat 19 and the collar 26 that is employed in the first embodiment is dispensed with.

(Interruption Action)

In the second embodiment constructed as above, during interruption action, the same action as in the case of the first embodiment is performed; however, a difference is that the circular convex surface section 15c of the piston head 15b abuts the end of the spring rod 5 rather than the restraining plate 7. A further difference is that the second piston 14 abuts the projections 19a of the second return spring seat 19 rather than the collar 26.

(Closure Action)

It should be noted that, in the second embodiment, in closure action, the same action as in the case of the first embodiment is performed: the closure action in the second embodiment can thus be easily deduced from the description of the interruption action given above, so a detailed description thereof is dispensed with.

(Beneficial Effect)

In addition to the same beneficial effects as in the case of the first embodiment described above, in the second embodiment constructed as described above, owing to the formation of the air chamber 29 defined by the internal cylinder 12 and plug 23, the air in the high-pressure chamber 25 can pass through the plug hole 23a into the air chamber 29, where it is trapped.

In this way, admixture of air with the operating fluid 24 on the side of the high-pressure chamber 25 can be reliably eliminated, making it possible to promote stabilization of the braking performance. At the same time, restrictions on the attitude of mounting of the buffering device 10 can be eliminated, so the degrees of freedom regarding installation of the buffering device 10 can be increased.

Also, the buffering device 10 in the second embodiment is fixed at the side of the restraining plate 7 of the support structure 6 of the operating mechanism of the switchgear rather than installed on the interruption spring 2. Consequently, there is no possibility of the buffering device 10 being driven with movement of the interruption spring 2. As a result, no loss in drive energy of the operating mechanism can occur in this way, so the efficiency of utilization of the drive energy is further increased. It should be noted that, in the second embodiment, the beneficial effect produced by the collar 26 can be achieved by the provision of projections 19a on the second return spring seat 19, so the number of members can be cut by eliminating the collar 26.

[3] Third Embodiment (Construction)

Figure 6:
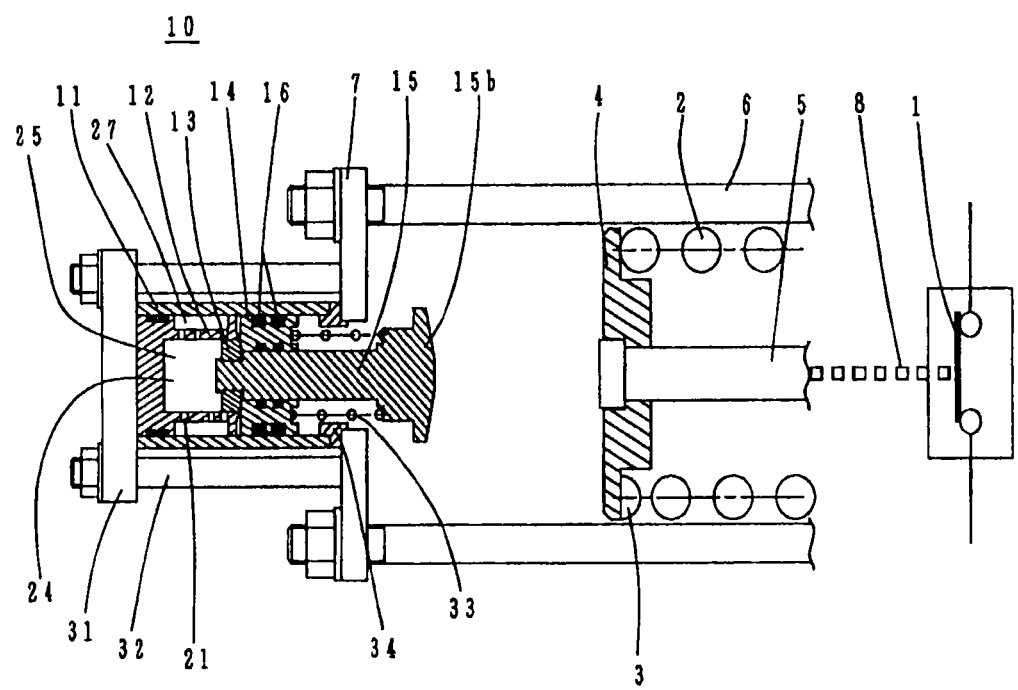
FIG. 6 is a cross-sectional view showing the closure condition of a buffering device for the operating mechanism of a switchgear according to a third embodiment of the present invention.

Next, a third embodiment of the buffering device for the operating mechanism of a switchgear according to the present invention will be described with reference to FIG. 6 and FIG. 7. FIG. 6 is a cross-sectional view showing the closure condition of the third embodiment and FIG. 7 is a view showing the interruption condition of the device of FIG. 6. It should be noted that parts that are identical with or similar to corresponding parts in the first embodiment and a second embodiment are given the same reference numerals, to avoid duplication of description.

The third embodiment is an improvement on the second embodiment and is characterized in that the construction is modified by dispensing with the first return spring 18 of the buffering device 10 shown in FIG. 5. Specifically, a stud 32 extending on the opposite side to that of the movable contact 1 is provided on the restraining plate 7 and a cylinder fixing plate 31 is mounted on the stud 32.

An external cylinder 11 is fixed between this cylinder fixing plate 31 and the restraining plate 7. An internal cylinder 12a having the same central axis is freely slidably arranged on the inside of the external cylinder 11 and a first piston 13 having the same central axis is freely slidably arranged on the inside of the internal cylinder 12.

Also, a first piston 13 is fixed to the end of the piston rod 15, a piston head 15b is fixed at the other end of the piston rod 15, and a second piston 14 having the same central axis is freely slidably arranged within the external cylinder 11. In addition, a packing 16 is fixed to the second piston 14 in the sliding portion of the external cylinder 11 and the piston rod 15.

Also, a return spring 33 is arranged between the end of the second piston 14 and the piston head 15b. Furthermore, a plurality of through-holes 21 are arranged in the internal cylinder 12 and operating fluid 24 is sealed in a high-pressure chamber 25 constituting the space defined by the external cylinder 11, internal cylinder 12, second piston 14 and piston rod 15.

When the end of the spring rod 5 that is fixed to the interruption spring seat 4 comes into contact with the circular convex surface section 15c of the piston head 15b and presses thereon, the operating fluid 24 in the high-pressure space 25 that is defined by the first piston 13 and the internal cylinder 12 is compressed, raising its pressure. Braking force of the buffering device 10 is thereby generated. Also, a ring 34 having the function of restraining the height of compression of the return spring 33 referred to above and the function of positional location is arranged between the external cylinder 11 and the restraining plate 7.

(Interruption Action)

In the third embodiment constructed as above, in interruption action, the same action is performed as in the case of the first embodiment and second embodiment, but the planar surface section 15d (opposite face to the circular convex surface section 15c) of the piston head 15b abuts (see FIG. 7) the restraining plate 7. Also this embodiment differs in that the second piston 14 abuts the ring 34.

(Closure Action)

Also, the same closure action is performed in the third embodiment as in the case of the second embodiment: however, the following points are different. Specifically, with extension of the return spring 33, the spring force of the return spring 33 is applied to the second piston 14, with the result that the operating fluid 24 in the liquid chamber 28 is rapidly returned to the high-pressure chamber 25 through the through-holes 21, so that return to the closed condition of the piston rod 15 can be rapidly effected. The details of the action can easily be inferred from the first embodiment and second embodiment, so a detailed description thereof may be dispensed with.

(Beneficial Effect)

In addition to the beneficial effects possessed by the first and second embodiments described above, the third embodiment constructed as above has the following independent beneficial effect. Specifically, by arranging the return spring 33 between the piston rod 15 and the second piston 14, the two actions of return of the piston rod 15 and return of the operating fluid 24 of the liquid chamber 28 to the high-pressure chamber 25 can be achieved by a single member.

In this way, the requirement to form an oil return path 15a in the piston rod 15 is eliminated and the layout of the members can be simplified. Furthermore, the overall length of the buffering device 10 can be reduced and the number of components also reduced: this contributes to increased compactness and lower costs.

[4] Fourth Embodiment (Construction)

Figure 8:
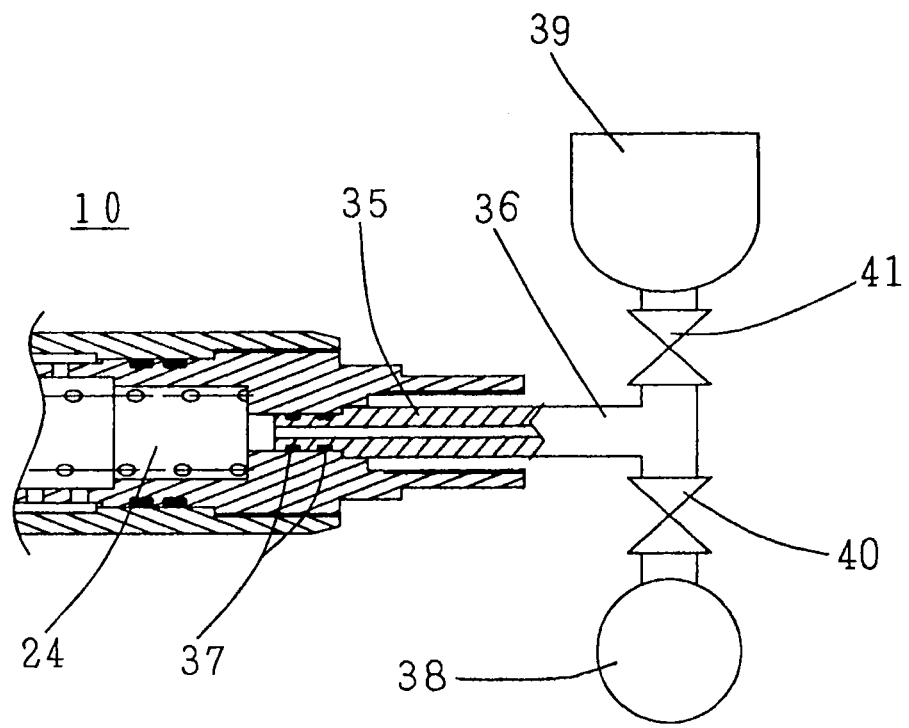
FIG. 8 is a cross-sectional view showing a method of lubrication of a buffering device for the operating mechanism of a switchgear according to a fourth embodiment of the present invention.

In addition, a method of lubricating a buffering device for the operating mechanism of a switchgear according to a fourth embodiment of the present invention is described with reference to FIG. 8. FIG. 8 is a cross-sectional view showing the construction of a fourth embodiment of the present invention.

As shown in FIG. 8, a lubricating plug 35 is inserted in place of the plug 23 and this lubricating plug 35 is connected with a conduit 36. A packing 37 is fixed in the vicinity of the tip of the lubricating plug 35. At some point, the conduit 36 is branched in two directions, one of these branches being connected with a vacuum pump 38 while the other is connected with the container 39 that accumulates operating fluid 24. In the conduit 36, a first valve 40 is arranged on the side of the vacuum pump 38 and a second valve 41 is arranged on the side of the container 39.

(Method of Lubrication)

In a buffering device 10 constructed as above, when the operating fluid 24 is introduced into the interior, the first valve 40 is opened and the second valve 41 is put into a closed condition; the interior of the buffering device 10 is then evacuated to a vacuum condition using the vacuum pump 38; next, by closing the first valve 40 and opening the second valve, the operating fluid 24 in the container 29 is introduced into the interior of the buffering device 10. Thus, as the operating fluid that is here employed, operating fluid is used that has been degassed beforehand in the vacuum container to remove air etc in the oil.

(Beneficial Effect)

With the fourth embodiment, operating fluid 24 that has been degassed by putting the interior of the buffering device 10 into a vacuum condition using the vacuum pump 38 is employed for lubrication, so gas such as air is substantially absent in the interior of the buffering device 10. Fluctuation of the braking force resulting from admixture of air with the operating fluid 24 can therefore be prevented. Furthermore, the operating fluid 24 can be made to enter all the narrow spaces between the components, without needing to introduce the operating fluid 24 into the interior of the buffering device 10 under pressure. In this way, the task of removing internal bubbles is eliminated, making it possible to greatly reduce the time for the lubrication task.

[5] Fifth Embodiment (Construction)

Figure 9:
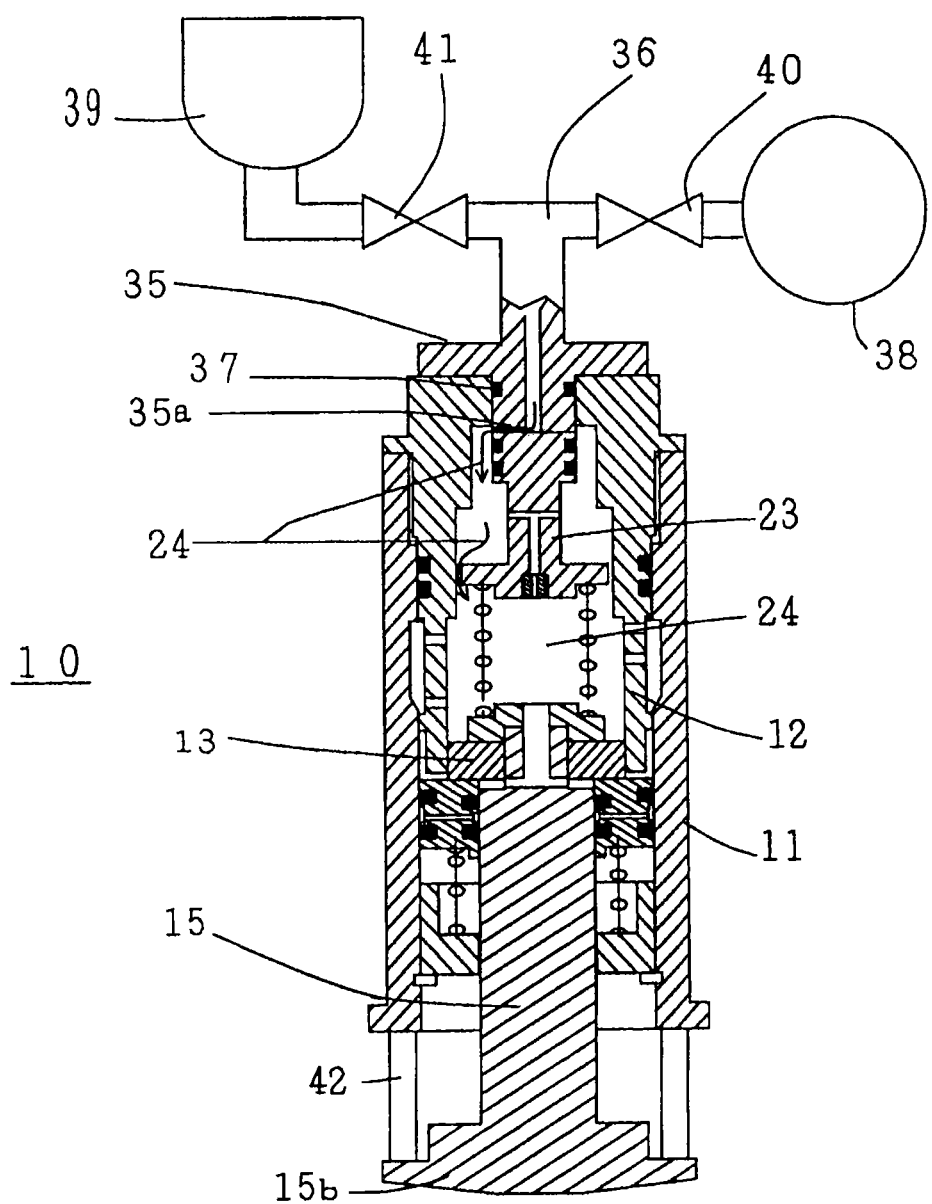
FIG. 9 is a cross-sectional view showing a method of lubrication of a buffering device for the operating mechanism of the switchgear according to a fifth embodiment of the present invention.

A second method of lubrication of a buffering device for the operating mechanism of the switchgear according to a fifth embodiment of the present invention is described with reference to FIG. 9. FIG. 9 is a cross-sectional view showing the construction of a fifth embodiment of the present invention. Parts that are identical with or similar to those of the fourth embodiment are given the same reference symbols, to avoid repetition of description.

A construction is adopted in which partial cutaway sections 35a are formed at the tip of the lubricating plug 35 of FIG. 9, and the plug 23 is pushed into the interior of the internal cylinder 12. Consequently, when cancelling the amount of the change in volume produced by the insertion of the target 35 into the interior of the internal cylinder 12, the space into which the operating fluid 24 in the buffering device 10 enters is expanded by fitting of a plate 42 between the piston head 15b and the end of the external cylinder 11. Other details of the construction are substantially the same as in the case of the fourth embodiment.

(Method of Lubrication)

The procedure for introduction of the operating fluid 24 into the interior of the buffering device 10 is substantially the same as in the case of the fourth embodiment; however, the plate 42 may be removed after removing the lubricating plug 35.

(Beneficial Effect)

The same beneficial effects as in the case of the fourth embodiment described above may also be obtained with the construction as above.

[6] Other Embodiments

The embodiments described above are purely by way of example and the present invention is not restricted to these embodiments. For example, although, in the above embodiments, compression coil springs were employed for the first return spring 18 and second return spring 20 and return spring 33, other resilient elements such as for example a dish spring or plate spring could be employed.

POSSIBILITIES OF INDUSTRIAL APPLICATION

The present invention can be applied to switchgears for power interruption.

What is claimed is:

1. A buffering device employed in an operating mechanism whereby opening/closing action of a switchgear is performed by reciprocal drive of a moving body including an electrical contact between open and closed positions, for reducing a speed of said moving body in a vicinity of termination of an action of the switchgear, said buffering device comprising:
   (1) a support structural body of said operating mechanism of said switchgear, whereby a restraining plate is fixed and an interruption spring is accommodated;
   (2) a spring rod fixed to said interruption spring;
   (3) in addition, a cylinder fixing plate that is fixed by means of a stud to said restraining plate;
   (4) an external cylinder fixed to said cylinder fixing plate;

(5) an internal cylinder that is freely slidably arranged, with a same central axis, within said external cylinder;
(6) a first piston respectively arranged within said internal cylinder, freely slidably arranged on said same central axis;
(7) a second piston respectively arranged within said external cylinder freely slidably arranged on said same central axis;
(8) a piston rod fixed to said first piston;
(9) a packing fixed in said second piston in a sliding portion of said external cylinder and said piston rod;
(10) a return spring that is arranged between an end of said second piston and said piston rod;
(11) a plurality of through-holes formed in an axial direction in said internal cylinder;
(12) a high-pressure chamber formed by a space defined by said external cylinder, said internal cylinder, said second piston and said piston rod;
(13) operating fluid that is sealed in said high-pressure chamber;
constructed in such a way that braking force is generated by compression of said operating fluid by said piston rod being forced into said high-pressure chamber by contact of said spring rod with said piston rod, on drive of said operating mechanism.

2. The buffering device of said operating mechanism of a switchgear according to claim 1, further comprising
a ring having a function of restricting a height of compression of said return spring and having a function of positional location is arranged between said external cylinder and said restraining plate.

3. The buffering device of said operating mechanism of a switchgear according to claim 1, further comprising
a piston head that receives compressing force from outside is provided on said piston rod,
wherein a diameter of said piston head is set to be less than a diameter of said piston rod.

4. The buffering device of said operating mechanism of a switchgear according to claim 1,
wherein a projection such as to temporarily hold up a flow of said operating fluid injected from said through-holes is arranged in substantially a same plane as said through-holes, at an end of said internal cylinder.

5. The buffering device of the operating mechanism of a switchgear according to claim 1,
wherein packings are respectively fixed at two locations on an outer circumference and inner circumference of said second piston;
an outer circumferential groove is formed between said two packings on an outer circumferential side;
an inner circumferential groove is formed between said two packings on an inner circumferential side; and
said outer circumferential groove and said inner circumferential groove communicate by means of through-holes, and a space for storage of operating fluid from said outer circumferential groove, said inner circumferential groove and said through-holes is formed.

\* \* \* \* \*